(12) United States Patent
Soto et al.

(10) Patent No.: US 7,027,314 B2
(45) Date of Patent: Apr. 11, 2006

(54) FILTERING DEVICE FOR CONVERTING ELECTRICAL ENERGY

(75) Inventors: Jose Emilio Soto, Paris (FR); Nicolas Brunet-Manquat, Puteaux (FR)

(73) Assignee: GE Medical Systems Global Technology Company LLC, Waukesha, WI (US)

( * ) Notice: Subject to any disclaimer, the term of this patent is extended or adjusted under 35 U.S.C. 154(b) by 65 days.

(21) Appl. No.: 10/404,375

(22) Filed: Apr. 1, 2003

(65) Prior Publication Data

US 2003/0218889 A1    Nov. 27, 2003

(30) Foreign Application Priority Data

May 21, 2002    (FR)    .................................... 02 06174

(51) Int. Cl.
*H02M 1/12*    (2006.01)
(52) U.S. Cl. ....................................................... 363/39
(58) Field of Classification Search .................. 363/39, 363/40, 44, 45, 46, 47, 48
See application file for complete search history.

(56) References Cited

U.S. PATENT DOCUMENTS

| | | | | |
|---|---|---|---|---|
| 4,184,131 A * | 1/1980 | Haus | ........................... | 333/195 |
| 5,323,304 A | 6/1994 | Woodworth | ................... | 363/47 |
| 5,523,936 A * | 6/1996 | Leu et al. | ................. | 363/21.04 |
| 5,541,558 A * | 7/1996 | Weber et al. | ................ | 333/174 |
| 5,805,032 A * | 9/1998 | Herbst et al. | ................ | 333/181 |
| 5,920,468 A * | 7/1999 | Brisson et al. | ................. | 363/39 |
| 5,956,246 A | 9/1999 | Sequeira et al. | ............ | 363/144 |
| 6,453,157 B1 * | 9/2002 | Roberts | ....................... | 455/337 |
| 6,518,859 B1 * | 2/2003 | Spampinato | ................. | 333/174 |
| 6,738,612 B1 * | 5/2004 | Imbornone et al. | .......... | 455/307 |

* cited by examiner

*Primary Examiner*—Matthew V. Nguyen
(74) *Attorney, Agent, or Firm*—Cantor Colburn LLP; Jay L. Chaskin

(57) ABSTRACT

A device for converting electrical energy at a high operating frequency, supplied by an electrical network having a capacitor placed between a line and an earth of the device, the capacitance of the capacitor being such that the high-frequency noise is filtered and an inductor placed parallel to the capacitor and having a low resonant frequency corresponding substantially to the frequency of the electrical supply network. The device provide filtering in order to prevent the transmission of high frequency interference from the device to the electrical network while preventing, as far as possible, leakage currents through the filter. The device is useful in the electrical network for an X-ray apparatus.

31 Claims, 3 Drawing Sheets

FILTERING DEVICE FOR CONVERTING ELECTRICAL ENERGY

CROSS-REFERENCE TO RELATED APPLICATIONS

This application claims the benefit of a priority under 35 USC 119(a)–(d) to French Patent Application No. 02 06174 filed May 21, 2002, the entire contents of which are hereby incorporated by reference.

BACKGROUND OF THE INVENTION

The present invention and embodiments thereof relates to the field of converting electrical energy from a single or multi-phase A.C. electrical network and more particularly to the filtering at the input of such a device.

The present invention and embodiments thereof relates to preventing interference due to the electrical energy conversion device from propagating over the supply network, in particular, in the case of a radiological or other imaging apparatus, for example, an X-ray apparatus comprising an X-ray tube supplied by a high D.C. voltage.

The present invention and embodiments thereof relates to an electrical energy conversion device placed between the electrical network and the X-ray tube, a low-voltage rectifier, a chopper or an inverter, a transformer and a high-voltage rectifier.

The active circuit components of the electrical elements, for example, transistors of the MOS or IGBT type, operate at high frequencies greater than 100 kHz and therefore also generate interference at high frequencies. This interference is likely to be transmitted to the electrical network, which is detrimental for the electrical energy supplier.

BRIEF DESCRIPTION OF THE INVENTION

The present invention and embodiments thereof provides a means for filtering in order to prevent the transmission of high-frequency interference from the energy conversion device to the electrical network while preventing, as far as possible, leakage currents through the filter.

The electrical energy conversion device with a high operating frequency, according to one aspect of the invention, is supplied by an electrical network and comprises a capacitor mounted between a line and an earth of the device, the capacitance of the said capacitor being such that the high-frequency noise is filtered, and an inductor placed parallel to the capacitor and having a low resonant frequency corresponding substantially to the frequency of the electrical supply network. Such a device meets the generally recognized electromagnetic compatibility requirements.

The present invention and embodiments thereof relates to a radiological apparatus, such as an X-ray apparatus comprising an X-ray tube, and an electrical energy conversion device for supplying the X-ray tube. The device provided is connected to a low-voltage A.C. electrical network, and comprises a capacitor placed between a line and an earth of the device. The capacitance of the capacitor is such that the high-frequency noise is filtered. The device comprises an inductor placed parallel to the capacitor and having a low resonant frequency corresponding substantially to the frequency of the electrical supply network.

BRIEF DESCRIPTION OF THE DRAWING

The present invention and embodiments thereof will be better understood from the detailed description and as illustrated by the appended drawings, in which.

DETAILED DESCRIPTION OF THE INVENTION

Figure 1:
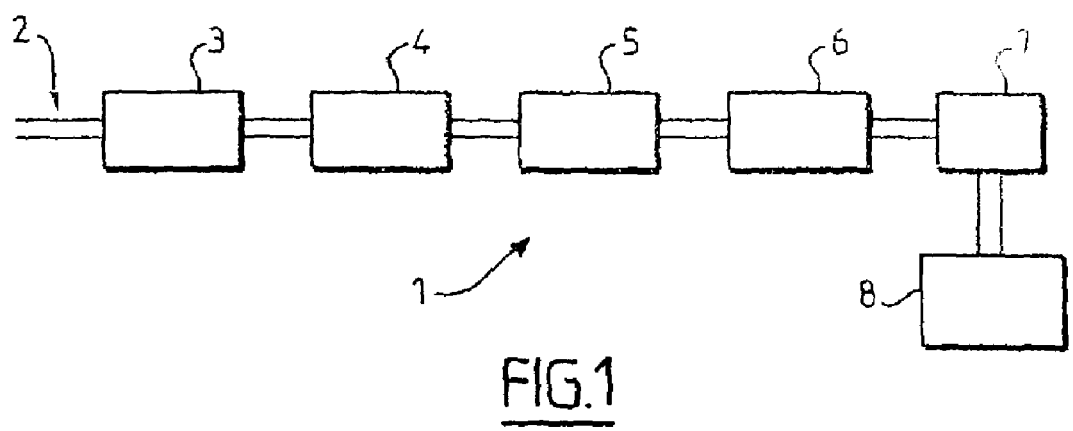
FIG. 1 is a schematic view of an X-ray apparatus, according to one aspect of the invention.

As can be seen in FIG. 1, a radiological imaging apparatus 1, such as an X-ray apparatus, is connected to a low-voltage electrical network 2, for example, of the single phase 220 volt type. The apparatus 1 comprises a filter 3 connected to the electrical network 2 to prevent interference passing back through to the electrical network 2.

A rectifier 4 is mounted downstream of the filter 3. In general, the rectifier comprises a plurality of diodes and/or power transistors mounted in a bridge. A chopper or an inverter 5 is mounted downstream of the rectifier 4 to provide at the output an A.C. voltage at the desired frequency in order to supply a voltage step-up transformer 6 mounted downstream.

The secondary of the transformer 6 is connected to a rectifier 7, which may be of the same type as the rectifier 4, the output of which provides a high D.C. voltage, of the order of a few tens or hundreds of kV, capable of supplying voltage for a means 8 for radiation emission, such as an X-ray tube, of the apparatus 1.

As shown in FIG. 1, in one embodiment of the invention, the device comprises a rectifier placed downstream of a capacitor and an inductor, and a chopper mounted downstream of the rectifier.

As shown in FIG. 1, in an embodiment of the invention, the device may comprise a transformer mounted downstream of the chopper, and a rectifier mounted downstream of the transformer in order to obtain a high D.C. voltage.

Figure 2:
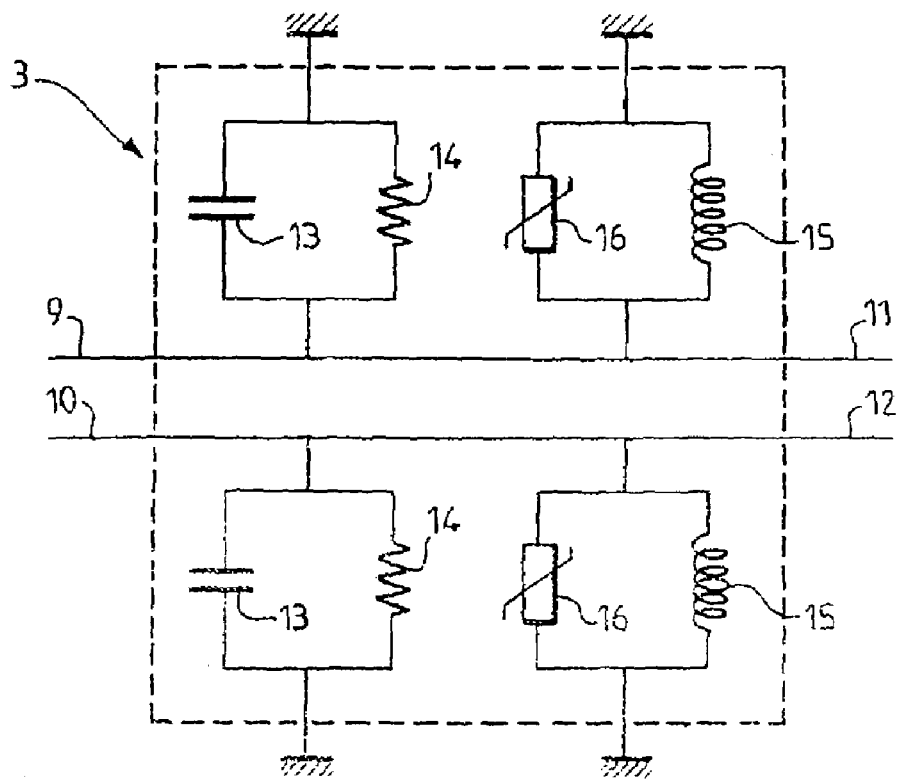
FIG. 2 is a circuit diagram of part of the device in single phase.

The structure of the filter 3 is illustrated more particularly in FIG. 2. The filter 3 comprises two input lines 9 and 10 and two output lines 11 and 12. The lines 9 and 11, 10 and 12 are connected directly to each other, respectively. A capacitor 13 is mounted between the line 9 and one earth of the device. A resistor 14 is mounted in parallel with the capacitor 13. Furthermore, an inductor 15 is mounted between the line 11 and one earth of the device. A lightning protection component 16, placed in a closed circuit at high voltage and in an open circuit at low voltage, is mounted in parallel with the inductor 15. The same electrical components and circuit arrangement are provided for the lines 10 and 12.

Thus, by virtue of an inductor having a very high inductance, an LC filter is obtained, the resonant frequency of which is about 55 Hz, which is thus equally suitable for a 50 Hz supply and for a 60 Hz supply.

Advantageously, the resonant frequency is between 45 and 450 Hz, preferably between 50 and 60 Hz for electrical networks of frequency 50 or 60 Hz, and about 400 Hz for electrical networks of this frequency. For standard electrical networks, at 50 and 60 Hz, it is possible to choose the resonant frequency of about 55 Hz.

Advantageously, the value of the inductor is between 1 and 150 henries, preferably between 10 and 100 henries, better still, greater than 50 henries, depending on the value of the capacitance and on the resonant frequency chosen.

By way of example, if it is calculated that the sum of the capacitances of one phase is 125.5 nF, then an inductor 15 of 66.7 henries will be taken, because of the equation $F=1/(2\pi^2 LC)=55$ Hz.

The resistor 14 serves to discharge the capacitors when no voltage is applied to the apparatus. The inductor and the capacitor form a filter placed at the input of the device, upstream of the rectifier.

In one embodiment of the invention, the capacitance of the capacitor is such that the high-frequency noise is filtered, specifically with frequencies greater than 150 kHz. A resistor may be mounted parallel to the capacitor for its discharge when no voltage is applied.

Figure 3:
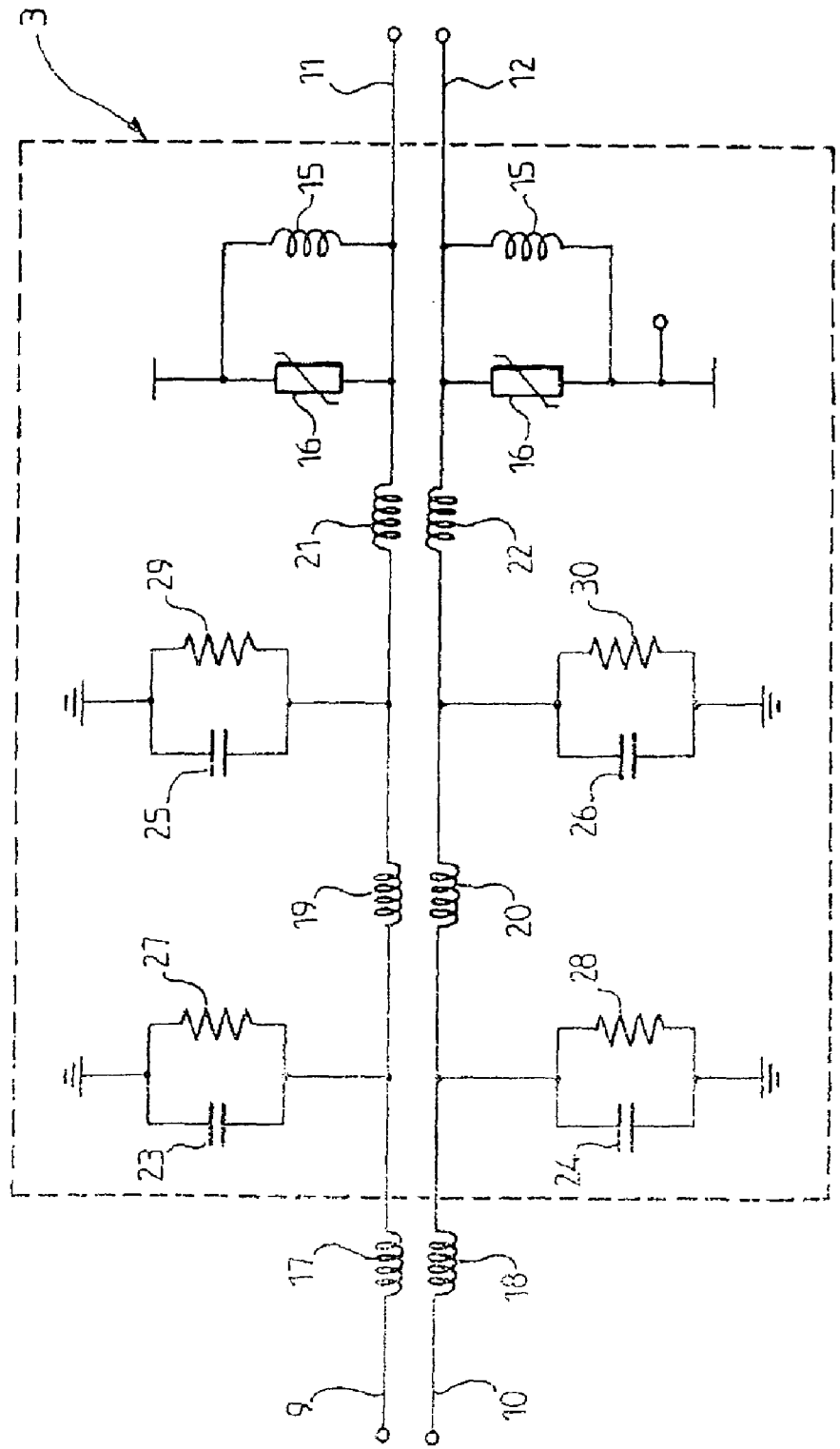
FIG. 3 is a fuller circuit diagram corresponding to FIG. 2.

FIG. 3 illustrates a fuller version of the filter 3 in which inductors 17 and 18 of the input lines 9 and 10 and inductors 19 and 20, 21 and 22 internal to the filter 3 and placed in series with the inductors 17 and 18, respectively, are taken into account.

Furthermore, two capacitors are provided on each line. At the input of the filter 3, the capacitor 23 is placed between the first input line 9 and the earth, in parallel with the resistor 27. The same holds for the second input line 10 of the capacitor 24 and of the resistor 28. The capacitor 23 is connected to the main line between the inductors 17 and 19. The capacitor 25 and the resistor 29 have the same structure and are connected to the main line between the inductors 19 and 21. The same holds for the second input line 10 of the capacitor 26 and of the resistor 30. The inductor 15 and the lightning protection component 16 are connected to the first input line 9 downstream of the inductor 21. The same holds for the second input line 10.

This type of structure having two capacitors 23 and 25 with the inductors of the lines 19 and 21, 20 and 22, respectively, has the function of forming a filter of higher order than a single capacitor-inductor structure.

Figure 4:
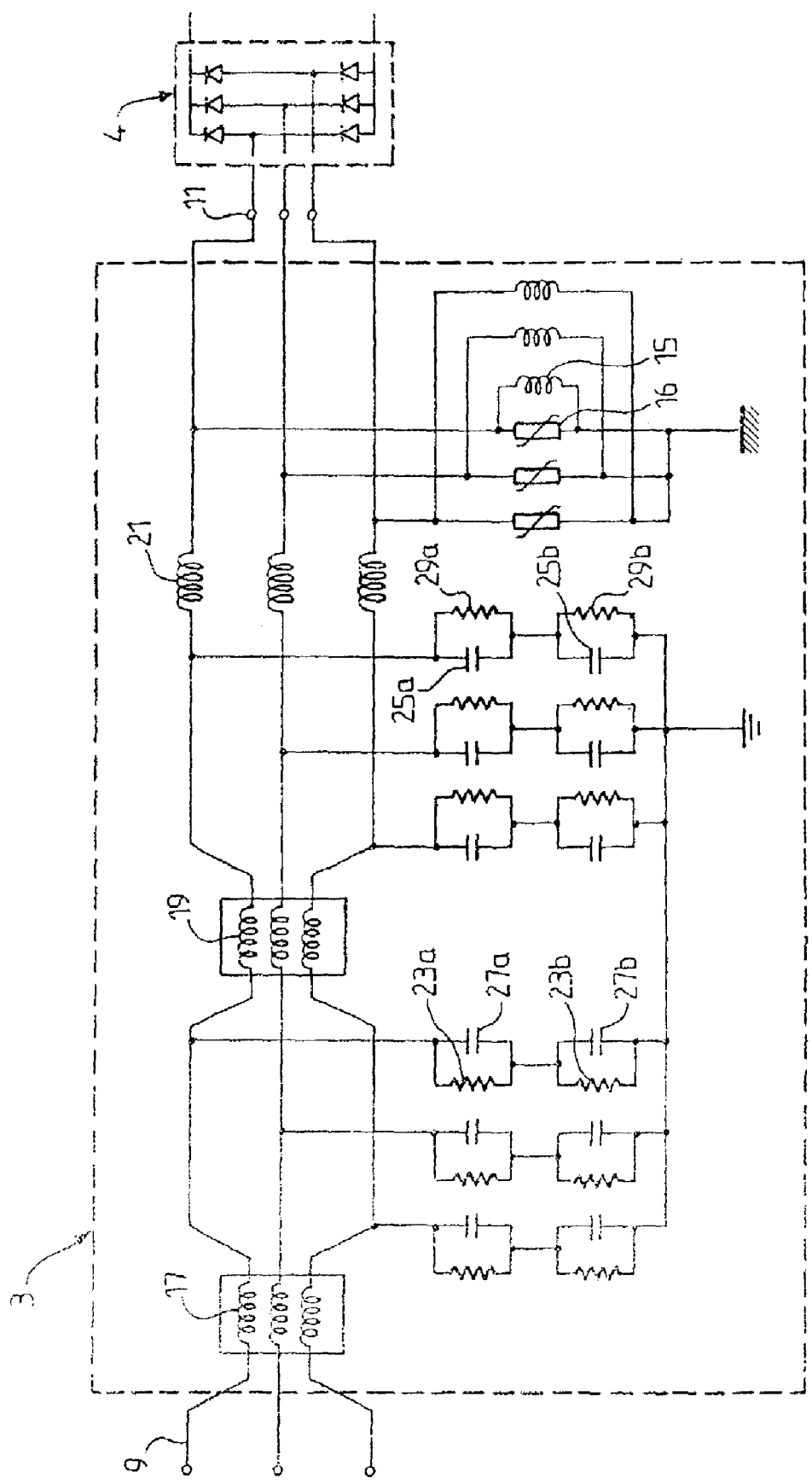
FIG. 4 is a circuit diagram similar to FIG. 3, in three phase.

In the three-phase embodiment illustrated in FIG. 4, only one of the three phases will be described, the other two being identical. The circuit of one phase is close to that illustrated in FIG. 3 except that two resistors 23a and 23b, 29a and 29b are provided in place of the resistor 28 and two capacitors 27a and 27b, 25a and 25b are provided in place of the capacitor 24. The capacitors 27a, 27b, 25a and 25b are mounted parallel to the resistors 23a, 23b, 29a and 29b, respectively. The resistors 23a and 23b are in series; the resistors 29a and 29b are also in series.

Thus, a filter suited for a high-frequency converter and satisfying the electromagnetic compatibility standards is obtained. The present invention and embodiments thereof provides a means for preventing the transmission of interference to the electrical supply network with the leakage currents being kept very low.

The leakage current at the mains frequency is extremely low, since the resonant frequency of the filter is very close to it, while, in contrast, the filter 3 provides excellent filtering at high frequencies, thus preventing high-frequency noise from passing into the supply lines 9 and 10 of the electrical network.

One skilled in the art may make or propose various modifications in structure and/or function and/or way and or manner of the disclosed embodiments without departing from the scope and extent of the invention.

What is claimed is:

1. A device for converting electrical energy at a high operating frequency, supplied by an electrical network, comprising:
   a capacitor placed between a line and ground of the device, the capacitance of the capacitor being such that noise from the high-frequency is filtered; and
   an inductor placed parallel to the capacitor and having a low resonant frequency corresponding substantially to the frequency of the electrical supply network wherein the value of the inductor is between 1 and 50 henries, preferably between 10 and 100 henries and wherein the resonant frequency is between 45 and 450 Hz, preferably between 50 and 60 Hz.

2. The device according to claim 1 wherein the value of the inductor is greater than 50 henries, depending on the value of the capacitance and the resonant frequency chosen.

3. The device according to claim 1 wherein the resonant frequency is about 55 Hz.

4. The device according to claim 1 wherein the capacitance of the capacitor is such that the noise of a frequency greater than or equal to 150 kHz is filtered.

5. The device according to claim 2 wherein the capacitance of the capacitor is such that the noise of a frequency greater than or equal to 150 kHz is filtered.

6. The device according to claim 3 wherein the capacitance of the capacitor is such that the noise of a frequency greater than or equal to 150 kHz is filtered.

7. The device according to claim 1 comprising:
   a rectifier is connected downstream of the capacitor and of the inductor; and
   a chopper is connected downstream of the rectifier.

8. The device according to claim 2 comprising:
   a rectifier is connected downstream of the capacitor and of the inductor; and
   a chopper is connected downstream of the rectifier.

9. The device according to claim 3 comprising:
   a rectifier is connected downstream of the capacitor and of the inductor; and
   a chopper is connected downstream of the rectifier.

10. The device according to claim 4 comprising:
    a rectifier is connected downstream of the capacitor and of the inductor; and
    a chopper is connected downstream of the rectifier.

11. The device according to claim 5 comprising:
    a rectifier is connected downstream of the capacitor and of the inductor; and
    a chopper is connected downstream of the rectifier.

12. The device according to claim 6 comprising:
    a rectifier is connected downstream of the capacitor and of the inductor; and
    a chopper is connected downstream of the rectifier.

13. The device according to claim 1 comprising:
    a transformer is connected downstream of the chopper; and
    a rectifier is connected downstream of the transformer in order to obtain a high D.C. voltage.

14. The device according to claim 2 comprising:
    a transformer is connected downstream of the chopper; and
    a rectifier is connected downstream of the transformer in order to obtain a high D.C. voltage.

15. The device according to claim 3 comprising:
    a transformer is connected downstream of the chopper; and
    a rectifier is connected downstream of the transformer in order to obtain a high D.C. voltage.

16. The device according to claim 4 comprising:
a transformer is connected downstream of the chopper; and
a rectifier is connected downstream of the transformer in order to obtain a high D.C. voltage.

17. The device according to claim 5 comprising:
a transformer is connected downstream of the chopper; and
a rectifier is connected downstream of the transformer in order to obtain a high D.C. voltage.

18. The device according to claim 6 comprising:
a transformer is connected downstream of the chopper; and
a rectifier is connected downstream of the transformer in order to obtain a high D.C. voltage.

19. The device according to claim 7 comprising:
a transformer is connected downstream of the chopper; and
a rectifier is connected downstream of the transformer in order to obtain a high D.C. voltage.

20. A radiological apparatus comprising:
means for radiation emission;
an electrical energy conversion device for supplying the means for emission;
the device being connected to a low-voltage A.C. electrical network;
the device comprising:
a capacitor placed between a line and ground of the device, the capacitance of the capacitor being such that noise from the high-frequency is filtered; and
an inductor placed parallel to the capacitor and having a low resonant frequency corresponding substantially to the frequency of the electrical supply network wherein the value of the inductor is between 1 and 50 henries, preferably between 10 and 100 henries and wherein the resonant frequency is between 45 and 450 Hz, preferably between 50 and 60 Hz.

21. The apparatus according to claim 20 wherein the means for emission is an X-ray tube.

22. The apparatus according to claim 20 wherein the inductor and the capacitor are connected at the input of the device.

23. The device according to claim 20 wherein the value of the inductor is greater than 50 henries, depending on the value of the capacitance and the resonant frequency chosen.

24. The device according to claim 20 wherein the resonant frequency is about 55 Hz.

25. The device according to claim 20 wherein the capacitance of the capacitor is such that the noise of a frequency greater than or equal to 150 kHz is filtered.

26. The device according to claim 20 comprising:
a rectifier is connected downstream of the capacitor and of the inductor; and
a chopper is connected downstream of the rectifier.

27. The device according to claim 20 comprising:
a transformer is connected downstream of the chopper; and
a rectifier is connected downstream of the transformer in order to obtain a high D.C. voltage.

28. The device according to claim 1 comprising:
a resistor in parallel with the capacitor.

29. The device according to claim 1 comprising:
a lightning protection component in parallel with the inductor.

30. The device according to claim 20 comprising:
a resistor in parallel with the capacitor.

31. The device according to claim 20 comprising:
a lightning protection component in parallel with the inductor.

* * * * *